US006205208B1

(12) United States Patent
Detlefsen et al.

(10) Patent No.: US 6,205,208 B1
(45) Date of Patent: Mar. 20, 2001

(54) METHOD AND APPARATUS FOR DYNAMIC PROCESSING OF DATA COMMUNICATIONS OF VARIOUS TYPES

(75) Inventors: George D. Detlefsen, San Leandro; Christian Kunz, San Lorenzo, both of CA (US); Mark Spowage, Seattle, WA (US)

(73) Assignee: World One Telecom, Ltd., Alameda, CA (US)

( * ) Notice: Subject to any disclaimer, the term of this patent is extended or adjusted under 35 U.S.C. 154(b) by 0 days.

(21) Appl. No.: 08/829,115

(22) Filed: Mar. 31, 1997

(51) Int. Cl.⁷ .................................................. H04M 11/00
(52) U.S. Cl. .................................... 379/93.05; 379/93.06; 379/93.07
(58) Field of Search ............................ 379/93.05, 93.06, 379/93.07, 93.08, 93.09, 93.11, 93.29, 93.31, 93.34

(56) References Cited

U.S. PATENT DOCUMENTS

| | | | |
|---|---|---|---|
| 5,283,819 | * | 2/1994 | Glick et al. ........................ 379/93.28 |
| 5,471,522 | * | 11/1995 | Sells et al. ........................ 379/93.11 |
| 5,577,105 | * | 11/1996 | Baum et al. ....................... 379/93.05 |
| 5,596,628 | * | 1/1997 | Klein ................................. 379/93.11 |
| 5,881,233 | * | 3/1999 | Toyoda et al. ...................... 358/402 |

\* cited by examiner

*Primary Examiner*—Curtis Kuntz
*Assistant Examiner*—Melur Ramakrishnaiah
(74) *Attorney, Agent, or Firm*—Blakely, Sokoloff, Taylor & Zafman

(57) ABSTRACT

A method and apparatus to identify/process dynamically telephony data over each of a set of channels. A system has one or more ports providing a set of channels for transfer of various types of (telephony) data (e.g., voice, fax, data modem, video teleconferencing, etc.). Upon detection of a data transfer request (e.g., a "call") on one or more channels, the system dynamically identifies the type of data as voice, fax, data modem, etc., on the channel(s) and executes appropriate routines to process and route the data.

19 Claims, 4 Drawing Sheets

METHOD AND APPARATUS FOR DYNAMIC PROCESSING OF DATA COMMUNICATIONS OF VARIOUS TYPES

BACKGROUND OF THE INVENTION

1. Field of the Invention

The invention relates to the field of data communication. More specifically, the invention relates to processing of various types of data (e.g., voice, fax, data modem, video/multimedia, etc.) over a set of communication channels.

2. Background Information

As technology in computer and telephony networks emerge and, in some instances converge, there is a growing need for such networks, as well as the devices that interface to such networks, to support larger amounts of data traffic, as well as be able to process the various types of data that may be exchanged on such networks. For example, current digital telephone networks may be used for a number of applications, such as voice, fax, data, etc. To take advantage of the relatively low cost of data transmission over computer networks (e.g., a LAN, the Internet, etc.), systems have been proposed to provide telephony services via computer networks.

Unfortunately, current network interface systems provide relatively limited flexibility, especially in applications where voice data may be used (e.g., telephone conversations over a digital data network). Existing voice servers, for example, that allow voice transmission over digital data networks are limited to only one channel (e.g., one phone number). Furthermore, in applications where more than one type of data (e.g., voice, fax, data modem, video/multimedia, etc.) may be transferred over a digital network, current interfaces require that a particular channel (e.g., a particular phone number, transmission media/line, etc.) be specified and limited to one type of service, such as voice service, so that that type of data may be processed appropriately at the time of transmission and/or reception.

Thus, what is desired is a digital communication interface that allows greater flexibility when processing voice and other types of data exchanged/transferred over any number of channels in a digital network.

SUMMARY OF THE INVENTION

The present invention provides a method and apparatus for dynamically identifying and processing telephony data over each of a set of channels is provided. A system has one or more ports providing a set of channels for transfer of various types of (telephony) data (e.g., voice, fax, data modem, video teleconferencing, etc.). Upon detection of a data transfer request (e.g., a "call") on one or more channels, the system dynamically identifies the type of data as voice, fax, data modem, etc., on the channel(s) and executes appropriate routines to process and route the data. According to one aspect of the invention, the telephony data is transferred in full and/or half-duplex and in real-time over a computer network and/or a telephony channel.

BRIEF DESCRIPTION OF THE DRAWINGS

The invention may be understood by referring to the following description and accompanying drawings which illustrate embodiments of the invention. In the drawings.

DETAILED DESCRIPTION

Figure 1A:
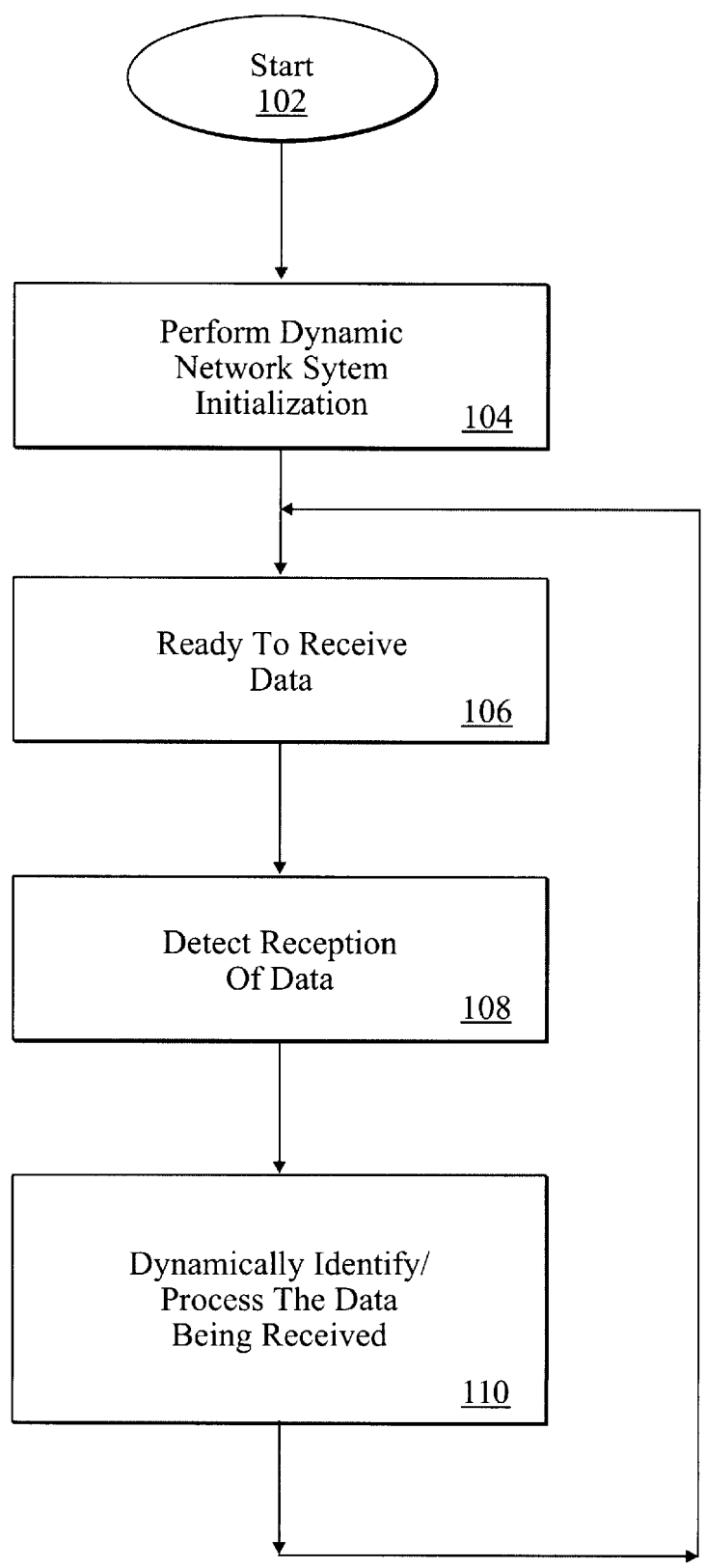
FIG. 1A is a flow diagram illustrating a method for dynamic processing of data exchange in a system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview of the Invention

This application describes a method and apparatus for dynamic (i.e., "on the fly") processing of various types of data transfer on any number of communication channels in a network. According to one aspect of the invention, an interface is provided for accepting any number of digital channels (e.g., T1 and/or E1 channels) over one or more lines. The interface provides the flexibility of allowing any number of types of data (e.g., voice, fax, data modem, video/multimedia, etc.) to be transferred (i.e., received and/or transmitted) over each channel by dynamically processing the data (e.g., identifying "on the fly" the type of data on each channel, executing protocol and/or compression/decompression routines accordingly, routing the data, etc.). The dynamic identification/processing provided by the present invention allows greater flexibility over existing telephony/computer network interfaces by allowing any number of digital communication channels (e.g., time-multiplexed channels of T1 and/or E1, T3, etc.) to be used for any number of telephony services (e.g., voice, fax, data modem, etc.) without the need to specify/designate the type of service for each channel.

In one embodiment, the invention is implemented as an interface card that includes one or more processors. The card may be interfaced to a (host) computer system(s), and includes a combination of hard-wired circuitry and software instructions for serving a gateway for exchanging, in substantially real-time and in full and/or half duplex, various types of data over a number of T1 and/or E1 Pulse Code Modulation (PCM) channels and a computer network (e.g., an Ethernet LAN, the Internet, an intranet, etc.). In this embodiment, the interface card dynamically identifies data transferred on a T1/E1 channel and/or on the network interface as one of voice, fax, data modem, etc. Once the type of data is determined, the system of the present invention processes the data accordingly, while providing appropriate routing (e.g., to another T1/E1 channel, to another interface at another gateway/router via a computer network, etc.) based on routing information contained in the received data. In a similar manner, the invention can receive via a computer network port(s) (e.g., an Ethernet line) and process dynamically a data packet/frame that includes telephony data. For example, a data packet containing telephony data (e.g., voice, fax, data modem, video teleconferencing data, etc.) may be routed to a user on a T1/E1 channel or may be routed to another network device, such as a gateway employing a similar interface card as embodied by the present invention. Additionally, the invention can be scaled to provide any number of data transfer lines/ports, each providing any number of digital data communication channels of any number of types (e.g., T1, E1, T3, etc.).

While a general overview of an embodiment of the invention has been provided, other features of the invention will be apparent from the figures and detailed description of the invention that follow.

Description of One Embodiment of the Invention

FIG. 1A is a flow diagram illustrating a method for dynamic handling/processing (e.g., any combination of "on the fly" operations, such as detection, compression, decompression, multiplexing, demultiplexing, protocol negotiation, session processing, routing, etc.) of data exchange in a system according to an embodiment of the invention. In FIG. 1A, flow begins at step 102. From step 102, flow passes to step 104.

In step 104, automatic system initialization is performed using a dynamic network boot sequence, and flow passes to step 106. In the described embodiment, the network boot sequence is performed using a BOOTP sequence, which is well-known and will not be described in further detail. In alternative embodiments, any combination of user and automatic techniques may used to initialize the system. In an embodiment described below with reference to FIG. 3, a Flash ROM is used at power-up in conjunction with a fast DRAM memory to perform the automatic network initialization.

In step 106, the system is ready to receive data (e.g., idle), and flow passes to step 108.

In step 108, it is detected that data is to be transferred via a network interface or a telephony interface (e.g., a T1/E1 interface), and flow passes to step 110. For example, the data may be the result of a telephone call (e.g., voice, fax, data, etc.) being placed on a T1/E1 channel of the telephony interface. On the other hand, data may be received as a packet/frame via the network interface. In the described embodiment, the network interface is implemented as an Ethernet type interface, while the telephony interface is implemented as a T1/E1 interface to one or more lines each providing 24 channels in the case of T1 and 30 channels in the case of E1. However, it should be appreciated that in alternative embodiments, the network interface may be implemented to interface to any number of network types, and similarly, the telephony interface may have any number of lines supporting any number of channels for voice and/or other types of data exchange.

In step 110, the type of the data being received is dynamically determined and processed, and flow returns to step 106. The description of FIG. 1B below provides greater detail with respect to step 110 for the case when it has been determined in step 108 that the data is received via the telephony interface.

Figure 1B:
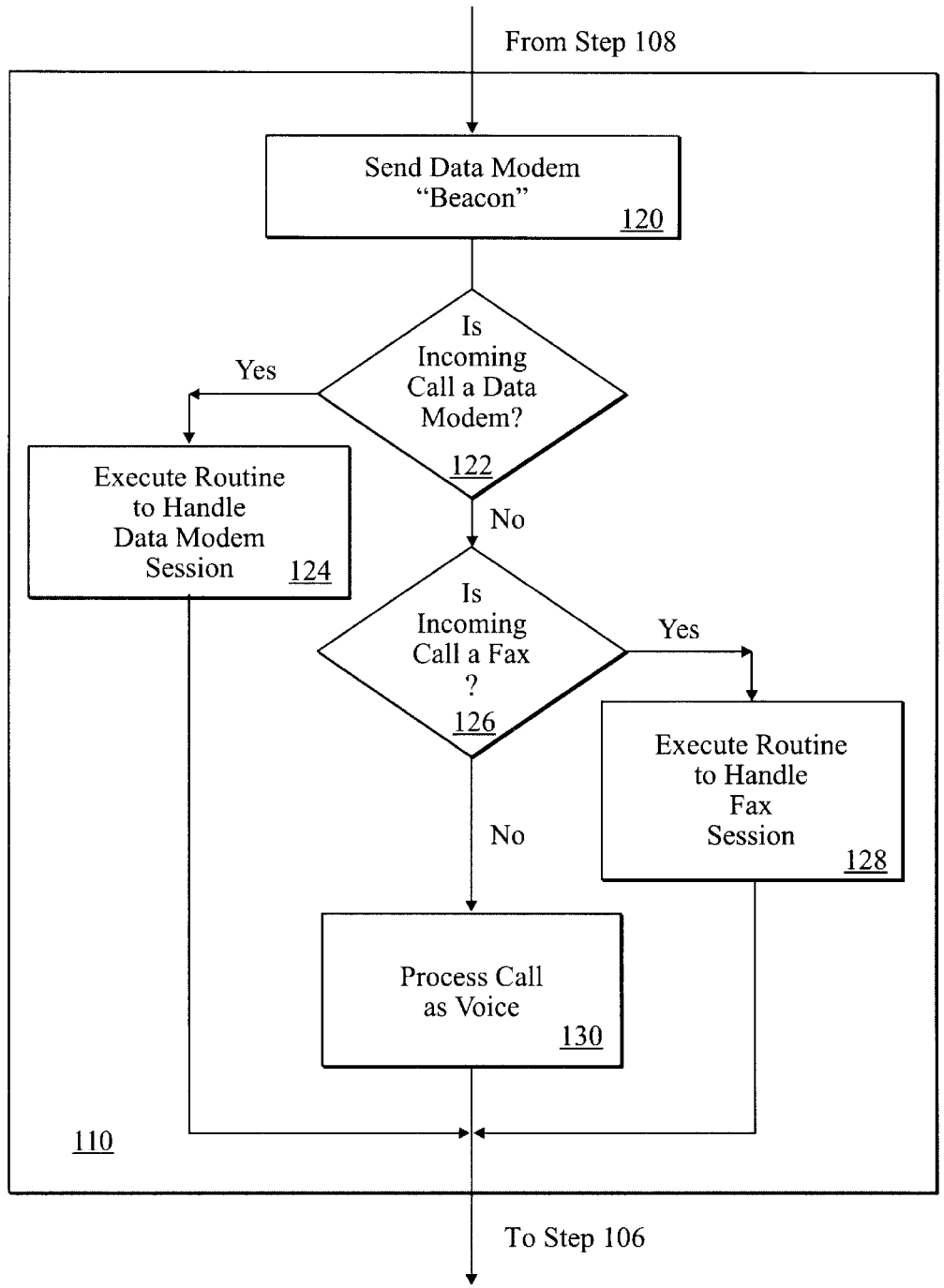
FIG. 1B is a flow diagram illustrating in greater detail step 110 of FIG. 1A.

Referring now to FIG. 1B, a flow diagram is shown illustrating step 110 of FIG. 1A is described for the case when the data is received via the telephony interface (e.g., the data represents voice, fax, data, etc.). In FIG. 1B, flow passes from step 108 to step 120.

In step 120, a data modem "beacon" signal (e.g., a signal/data representing a V.34 and/or other data modem answer tone) is transmitted via a T1/E1 channel on which a "ring" has been detected, and flow passes to step 122. It should be appreciated that a "ring" or "call" in such a digital data communication system is typically represented as a series of bits. In the described embodiment, the beacon signal is transmitted for a relatively short duration of time, during which the system determines, by waiting for data representing another modem's acknowledgment "tone" to begin protocol negotiation (e.g., V.34 or other data modem/data communication protocol).

In step 122, if it is determined that the incoming data ("call") is being received from a data modem, flow passes to step 124. Otherwise, flow passes to step 126.

In step 124, an appropriate routine is called and executed for processing the incoming modem-type data. For example, in one embodiment, the following steps are taken to process the modem "call": (1) modem protocol is negotiated; (2) a query for Point-to-Point Protocol (PPP) is made; and (3) a Telnet session and a PPP session are processed. Of course, depending on the type of data modem transmission, any number of techniques relating to protocols, compression/decompression routines, etc. may be used to process the data modem communication. Once the modem "call" has been processed and completed, flow passes to step 106.

In step 126, it is determined whether the incoming data (or "call") represents a fax transmission. Accordingly, in step 126, the system awaits for a relatively short duration of time (e.g., a few seconds) for a fax "tone" (e.g., data representing a V.29 and/or other type of fax tone). If it is determined that the incoming data represents a fax transmission, flow passes to step 128. Otherwise, flow passes to step 130.

In step 128, appropriate fax protocol routines (e.g., V.29 fax protocol routines and/or other compression/decompression routines) are loaded and executed to process the fax session, and flow returns to step 106. It should be appreciated that any number of fax protocols and/or compression/decompression routines may be utilized to process the fax session. For example, in the described embodiment, several fax compression/decompression protocols are supported, including Group 3 (G3) and Group 4 (G4).

In step 130, the incoming call is processed as a voice message, and flow passes back to step 106. In one embodiment, data representing an audio message is transmitted that requests a user placing a call on one of the T1/E1 channels, for example, to enter a telephone number to which the system of the present invention can route the call via a computer network (e.g., an intranet, the Internet, etc.). In several embodiments of the invention, the data representing voice or other audio is compressed/decompressed in step 130. For example, voice/audio compression/decompression modules such as G.729, G.723.1, and/or others are stored and executed for processing voice data in the described embodiment.

While one embodiment has been described wherein a data modem "beacon" is transmitted initially to begin identification and processing of incoming telephony data, alternative embodiments may use any number of techniques for identification/processing of telephony data communication. For example, data representing a voice message and/or fax "handshake" signals may be initially transferred. Thus, the steps shown in FIG. 1B can be performed in several alternative sequences/combinations to dynamically identify the type of telephony data being transferred. In addition, alternative embodiments of the invention may utilize a frequency analysis technique (e.g., a Fast Fourier Transform [FFT]) to determine and process dynamically the type of the incoming data ("call") as voice, fax, data modem, etc.

Additionally, it should be apparent from the description of FIGS. 1A and 1B that techniques similar to the ones described can be used for processing a data packet that may contain a type of data (e.g., voice, fax, data modem, etc.) transferred via a port of the network interface (e.g., via an Ethernet port).

Figure 2:
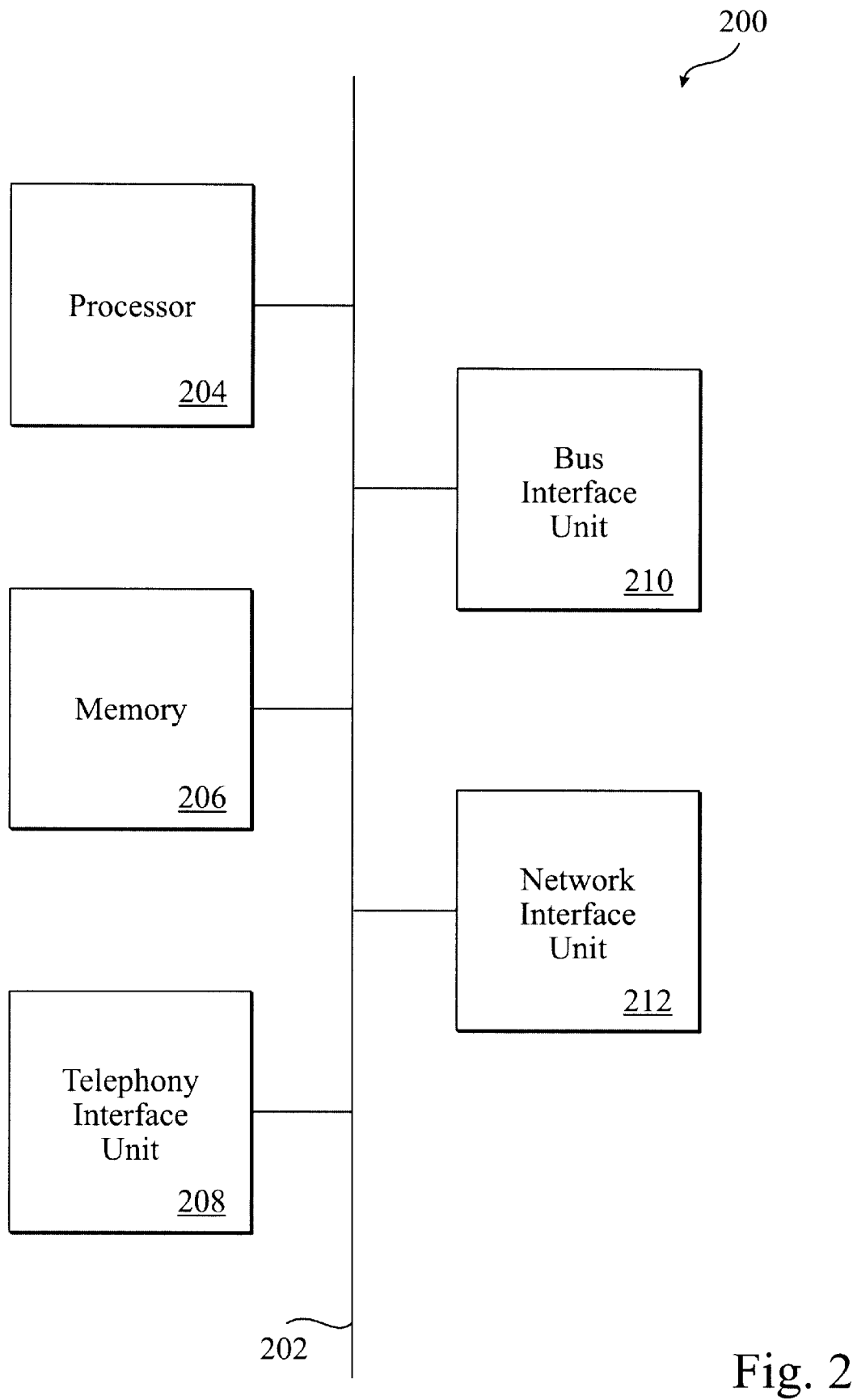
FIG. 2 is a block diagram illustrating an implementation of a system for providing dynamic processing of telephony data communication according to one embodiment of the invention.

FIG. 2 is a block diagram illustrating a system for providing dynamic processing of telephony data communication according to one embodiment of the invention. FIG. 2 illustrates a system 200 that includes a processor 204, a memory 206, a telephony interface unit 208, a bus interface unit 210, and a network interface unit 212, all coupled to a bus 202. It should be appreciated that the bus 202 represents any number and types of data transmission media, and may be used for serial and/or parallel exchange of memory and/or I/O addresses, instructions, data, control signals, etc. Similarly, the telephony interface unit 208 may exchange (i.e., send and/or receive) on each of a number of digital channels any number of types of data, such as voice, fax, computer data, etc. In the described embodiment, the telephony interface unit 208 represents a time-division multiplexed (TDM) type interface (e.g., T1/E1, T3, etc.) that provides 24 T1 channels and/or 30 E1 channels. However, it should be understood that in alternative embodiments, the telephony interface unit 208 may support any number of types of telephony data transfer techniques on one or more lines/ports. Furthermore, the system 200 may utilize any combination of synchronous and asynchronous data exchange.

The memory 206 represents any combination, number, and/or type of machine-readable media and/or memory (e.g., DRAM, SRAM, ROM, flash ROM, CD ROM, magnetic storage, EPROM, etc.). In the described embodiment, the memory 206 is configured to store a number of modules/routines used to process dynamically telephony data, including a DTMF encoder/decoder, caller identification decoder, callback routine, echo cancellation routine, PPP protocol, data/voice compression/decompression routines, fax session routines/protocols, and data modem session protocols/routines.

As will be described below with reference to FIG. 3, multiple processors are used in some embodiments of the invention to improve data processing efficiency. However, while the system shown in FIG. 2 includes the processor 204, alternative embodiments do not necessarily include a processors (e.g., only an interface to an external host processor or the like may be utilized, for example via the bus interface unit 210). Therefore, any number of processors and/or other circuitry (e.g., Digital Signal Processing [DSP] circuitry) may be utilized in lieu of or in combination with the processor 204 to dynamically process various types of data exchange over one or more channels.

As mentioned above, in the described embodiment, the telephony interface unit 208 is configured as a T1/E1 interface, and supports one or more lines each providing 24 T1 and/or 30 E1 channels for data exchange. In the system 200, telephony and/or other types of data are exchanged (received and/or transmitted) via the telephony interface 208 and the network interface 212. The network interface unit 212 is configured as a dual mode (10 Base/100 Base) Ethernet type interface. In alternative embodiments, the network interface unit 212 can be configured to provide communication via one or more ports with any number of network protocols and data transmission media (e.g., fiber, coaxial transmission lines, etc.). While in the described embodiment, the system 200 provides full-duplex communication via the telephony interface unit 208 and the network interface unit 212, in alternative embodiments, the system 200 may include any combination of multi-channel telephony interfaces and network interfaces, and thus be configured in any number of ways to exchange data.

The processor 204 executes routines stored in the memory 206 and/or microcode instructions to process data exchange via the telephony interface 208 and/or the network interface 212. The bus interface 210 allows the system 200 to be coupled to any number and type of other digital systems (e.g., a host PC, a network management system, routing/switching devices, etc.). Thus, in some implementations of the invention, a portion of the operation of the system 200 may be under control of a host system interfaced via the bus interface unit 210. However, alternative embodiments do not necessarily include a bus interface unit and/or interface with a host system.

Figure 3:
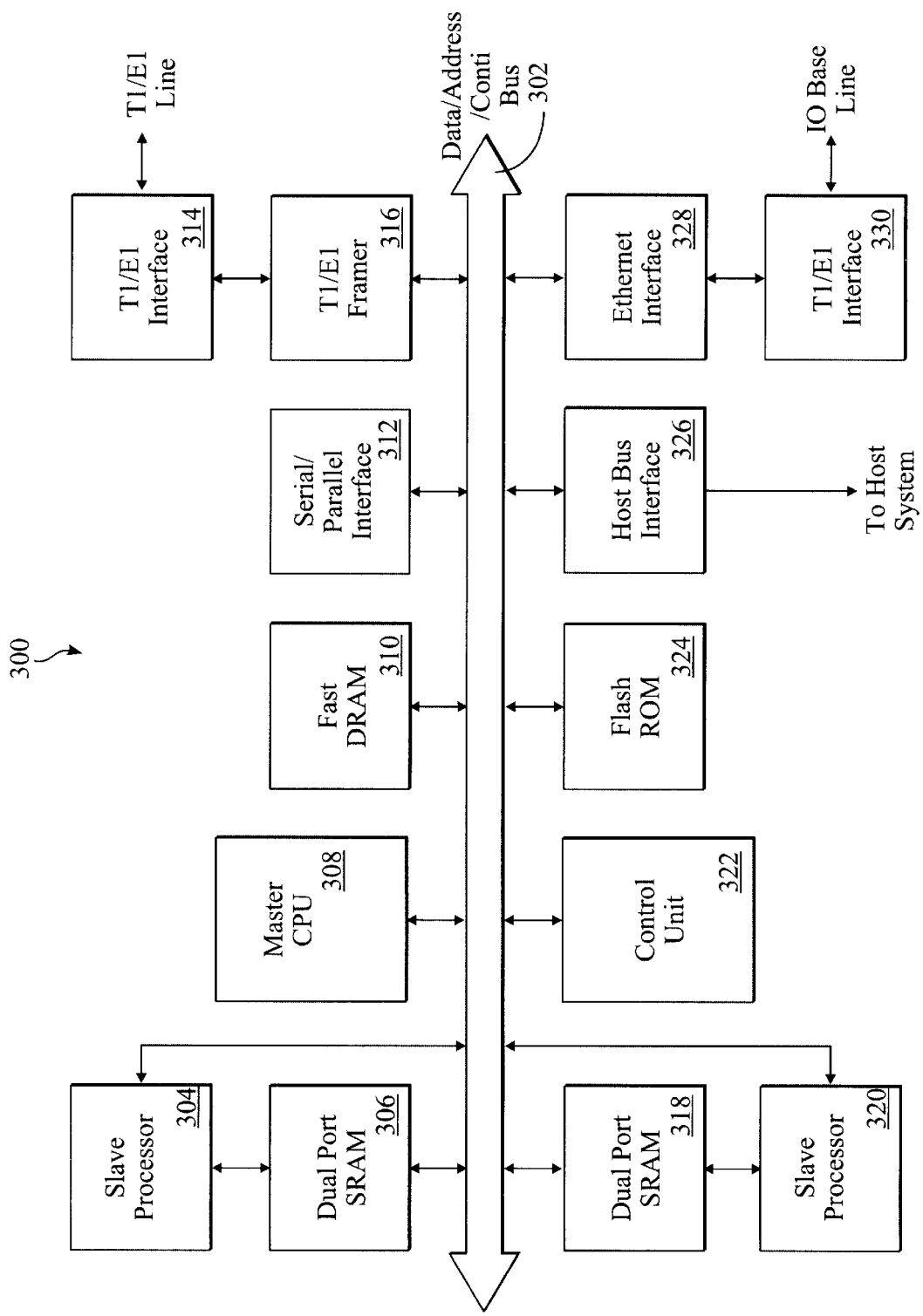
FIG. 3 is a block diagram illustrating an implementation of a system for providing dynamic processing of telephony data communication according to one embodiment of the invention.

Referring now to FIG. 3, a block diagram illustrating a system for dynamic processing of telephony data communication according to one embodiment of the invention is shown. The system 300 shown in FIG. 3 is a T1/E1 computer that provides dynamic identification and processing of telephony data exchange over a digital network(s). The system 300 includes a control unit 322 that is coupled to a data/address/control bus 302. In the described embodiment, the control unit 322 includes a bus arbiter for sequencing bus access to a 32-bit master CPU 308 coupled to the bus 302, a slave processor 304 and a slave processor 320 and/or other devices included in or interfaced with the system 300, as well as a dynamic random access memory (DRAM) controller for controlling a fast DRAM 310. In addition to the control unit 322, tri-state buffers and/or other devices may be included in the system 300 for controlling access to a dual port static random access memory (SRAM) 306 and an SRAM 318, coupled to the slave processors 304 and 320, respectively, and further coupled to the bus 302. It should be appreciated that other devices not shown in the system 300, such as transceivers, registers, etc. may be used in instances where power compatibility between devices must be taken into consideration. Such techniques/devices are well-known and not necessary for understanding of the invention, and thus will not be described in further detail.

While the system shown in FIG. 3 includes two slave processors (the slave processors 304 and 320), alternative embodiments do not necessarily include slave processors and/or the SRAMs 306 and 318, or may utilize any number of additional processors. For example, in applications that involve mostly T1-Ethernet routing, there may not be a need for additional/slave processors. However, in some applications (e.g., applications that require voice data compression/decompression), a set of slave processors may be used to improve efficiency in the processing of data, depending on the processing power of the master CPU 308. Furthermore, while in the described embodiment, the master CPU 308 is configured to interface to a 32-bit address bus, as well as a 32-bit data bus, alternative embodiments can utilize any number of type(s) of processors.

The control unit 322 may also contain any combination of a debug interface (e.g., to another/host computer), a CPU bus interface, a flash ROM controller to control a flash ROM 324 coupled to the bus 302, and a bus controller to control a host bus interface 326 also coupled to the bus 302. While in the described embodiment, the host bus interface 326 represents an ISA/PCI interface, alternative embodiments do not necessarily include a host bus interface or may any type of bus.

In one embodiment, the flash ROM 324 is utilized to store operational routines for processing data communication. Furthermore, routines may be downloaded into the flash ROM 324 and/or reset of the flash ROM 324 may be performed via an external system (e.g., a network server) using a loader routine stored in the flash ROM 324. Thus, routines stored in the flash ROM 324 can be dynamically loaded, updated, etc. over a network (e.g., an intranet) from servers. Furthermore, the flash ROM 324 is configured to dynamically initialize the system 300 using a network initialization sequence (e.g, a BOOTP).

The system 300 also includes a serial/parallel data interface coupled to the bus 302 and a T1/E1 framer 316, which in turn is coupled to a T1/E1 interface 314 that provides connection to a T1/E1 line. Similarly, an Ethernet interface 328 is coupled to the bus 302 and a T1/E1 interface that provides connection to an Ethernet (e.g., a 10BaseT) line. It should be appreciated that interfaces to any number of types of networks (e.g., 100BaseT, ATM, fiber channel, etc.) may be utilized in alternative embodiments of the invention. Furthermore, the system 300 can be scaled to provide any number of T1/E1 and network lines/ports, each providing a number of telephony data communication channels. Similarly, the system 300 can be configured to support other types of digital telephony data interfaces having any number of channels.

Alternative Embodiments

While the invention has been described in terms of several embodiments, those skilled in the art will recognize that the invention is not limited to the embodiments described. In particular, the invention can be practiced in several alternative embodiments that provide dynamic processing (e.g., detection, identification, routing, compression/decompression, protocol negotiation, etc.) of various types of telephony data (e.g., voice, fax, data modem, video/multimedia, etc.) that is transferred over a number of channels. Furthermore, the invention can be implemented using any combination of hard-wired circuitry and software instructions.

Therefore, it should be understood that the method and apparatus of the invention can be practiced with modification and alteration within the spirit and scope of the appended claims. The description is thus to be regarded as illustrative instead of limiting on the invention.

What is claimed is:

1. An apparatus in communication with a network, said apparatus comprising:
    a first port coupled to transfer data over a set of digital channels with said network; and
    a first circuit, coupled to said first port and configured to identify dynamically the data exchanged on each of said set of digital channels as representing one of voice and a first type of data;
    said first circuit comprising a first processor; and a memory coupled to said first processor, said memory configured to store a set of routines, a subset of said set of routines to be executed by said first processor to process said data exchanged on said each of said set of digital channels based on identification of said data as representing one of voice and said first type of data; and
    said first circuit comprising a flash memory configured to store said routines that are updated dynamically via said network.

2. The apparatus of claim 1, wherein said set of digital channels represents a plurality of T1 or E1 channels.

3. The apparatus of claim 1, wherein said first circuit further comprises:
    a second processor, said second processor configured to process another subset of said set of routines to process said data.

4. The apparatus of claim 1, wherein said set of routines comprises:
    a set of fax data protocols;
    a set of data modem protocols; and
    a voice compression routine.

5. The apparatus of claim 1, wherein said first type of data represents fax data.

6. The apparatus of claim 1, wherein said first type of data represents data transferred via a data modem.

7. The apparatus of claim 1, wherein said first port provides full-duplex data transfer.

8. A method for processing digital telephony data transfer over a plurality of digital channels in communication with a network, comprising the machine-implemented steps of:
    detecting telephony data on a first digital channel of said plurality of digital channels;
    transmitting a signal over said first digital channel;
    identifying said telephony data transferred via said first channel as representing one of voice and a first type of data;
    identifying the type of said telephony data based on a response to said signal received on said first channel;
    storing a set of routines in a flash memory;
    causing a first processor to execute a subset of said set of routines to process said data exchanged on said each of said set of digital channels based on identification of said data as representing one of voice and said first type of data; and
    updating said routines dynamically via said network.

9. The method of claim 8, further comprising the steps of:
    executing a routine stored on a machine-readable medium to process said telephony data; and
    routing said telephony data over a digital network.

10. The method of claim 8, further comprising the steps of:
    executing a routine stored in a memory to process said telephony data; and
    routing said telephony data over a digital network.

11. An apparatus comprising:
    a first port configured to transfer telephony data over a plurality of digital channels;
    a second port configured to interface with a computer network;
    a processor, coupled to said first port and said second port, said processor configured to identify telephony data transferred via a first digital channel of said plurality of digital channels as representing one of voice and a first type of data;
    a memory coupled to said processor, said memory configured to store a set of routines, a subset of said set of routines to be executed by said processor to process said data exchanged on said each of said set of digital channels based on identification of said data as representing one of voice and said first type of data; and
    flash memory configured to store said routines that are updated dynamically via said network.

12. The apparatus of claim 11, wherein said processor, upon dynamically determining the type of said telephony data, routes said telephony to said computer network via said second port.

13. The apparatus of claim 11, further comprising a memory coupled to said processor and configured to store a set of routines to be executed by said processor for processing said telephony data.

14. The apparatus of claim 13, wherein a subset of said set of routines is selected, based on identifying said telephony data as representing one of voice and a first type of data, and executed to process said telephony data.

15. The apparatus of claim 11, further comprising a machine-readable medium coupled to said processor and configured to store a set of routines to be executed by said processor for processing said telephony data.

16. The apparatus of claim 11, further comprising an interface coupling said apparatus to a computer system.

17. The apparatus of claim 11, wherein said first type of data represents fax data.

18. The apparatus of claim 11, wherein said first type of data represents modem data.

19. The apparatus of claim 11, wherein said first type of data comprises video data.

* * * * *